US009779012B1

(12) United States Patent
Muralidaran et al.

(10) Patent No.: US 9,779,012 B1
(45) Date of Patent: Oct. 3, 2017

(54) DYNAMIC AND GLOBAL IN-SYSTEM DEBUGGER

(71) Applicant: MBIT WIRELESS, INC., Irvine, CA (US)

(72) Inventors: Pravinkumar Muralidaran, Tamilnadu (IN); Sivakumar Govindassamy, Irvine, CA (US); Prakash Neelakandan Malliga, Tamilnadu (IN)

(73) Assignee: MBIT WIRELESS, INC., Irvine, CA (US)

( * ) Notice: Subject to any disclaimer, the term of this patent is extended or adjusted under 35 U.S.C. 154(b) by 35 days.

(21) Appl. No.: 15/054,300

(22) Filed: Feb. 26, 2016

(51) Int. Cl.
*G06F 9/44* (2006.01)
*G06F 11/36* (2006.01)

(52) U.S. Cl.
CPC ................ *G06F 11/3664* (2013.01)

(58) Field of Classification Search
CPC .................................................. G06F 11/3664
See application file for complete search history.

(56) References Cited

U.S. PATENT DOCUMENTS

| | | | | |
|---|---|---|---|---|
| 5,175,856 A * | 12/1992 | Van Dyke | ................. | G06F 8/41 711/E12.006 |
| 5,560,009 A * | 9/1996 | Lenkov | ..................... | G06F 8/41 714/E11.209 |
| 6,625,688 B1 * | 9/2003 | Fruehling | ........... | G06F 11/2236 711/109 |
| 6,701,514 B1 * | 3/2004 | Haswell | .............. | G06F 11/3664 707/999.102 |
| 2001/0005852 A1 * | 6/2001 | Bogle | ................. | G06F 9/45512 718/102 |
| 2002/0174415 A1 * | 11/2002 | Hines | ........................ | G06F 8/36 717/127 |
| 2006/0259744 A1 * | 11/2006 | Matthes | .............. | G06F 15/7867 712/220 |
| 2010/0192026 A1 * | 7/2010 | Abadi | ..................... | G06F 11/08 714/53 |

OTHER PUBLICATIONS

"DWARF Debugging Information Format" DWARF Debugging Information Committee Version 4 http:/www.dwarfstd.org; (2010).

* cited by examiner

*Primary Examiner* — Chameli Das
(74) *Attorney, Agent, or Firm* — Lerner, David, Littenberg, Krumholz & Mentlik, LLP

(57) ABSTRACT

The conventional debugger tool used to debug the Embedded System is limited to JTAG as the standard physical interface and also to specific processor. The commercial debuggers are limited to specific Operating System of the Host machine where the symbol information is being viewed. The Dynamic and Global In-system debugger provides the replacement for the typical debugger still providing the symbol information details in the Embedded System. The debugger is OS agnostic, interface agnostic, processor agnostic and compiler agnostic with optimized algorithm in the extraction of Global symbols from the Executable Binary. The Executable Binary may be encrypted to keep it more secured and Global and In-system debugger decodes the same.

20 Claims, 10 Drawing Sheets

Prior Art

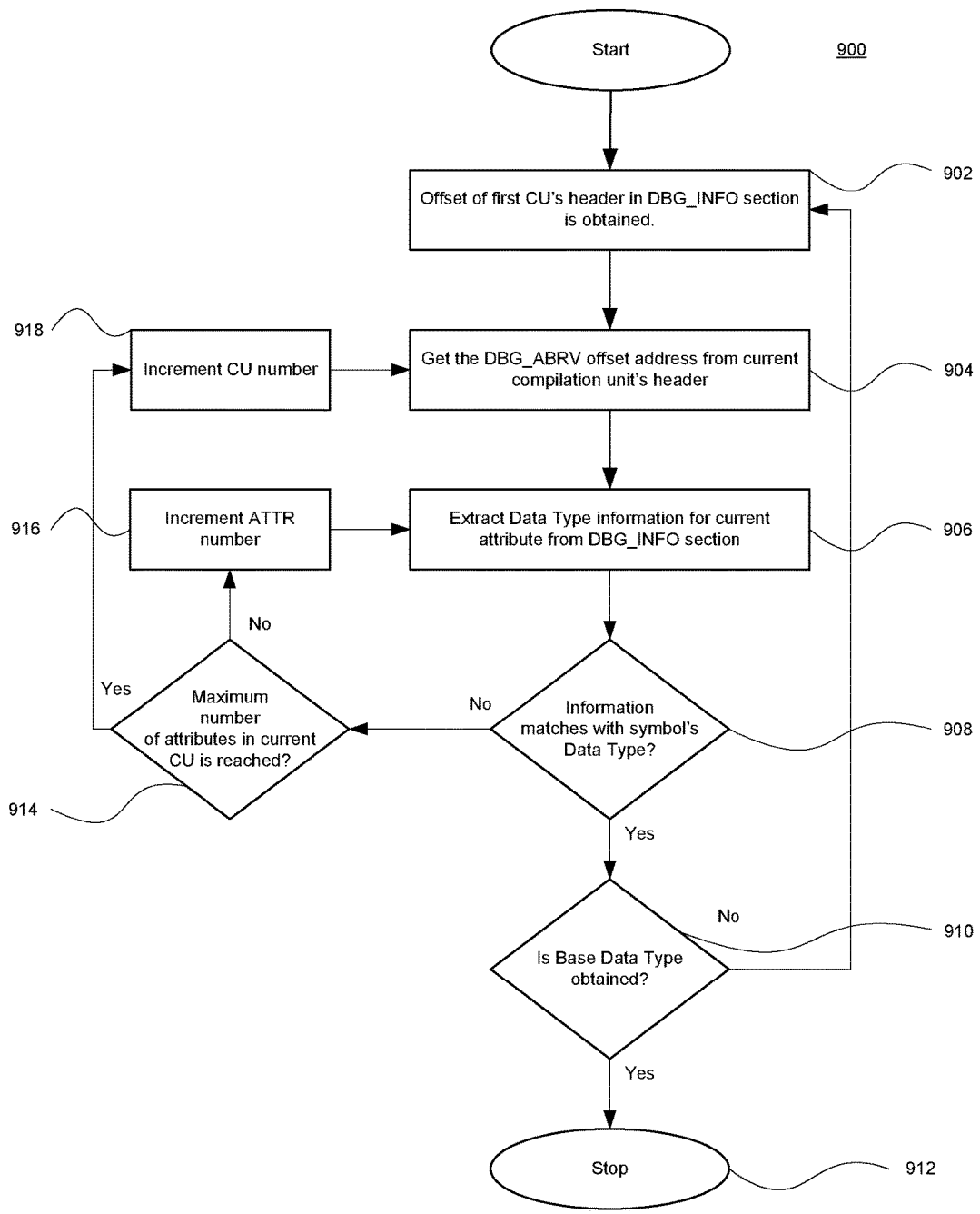

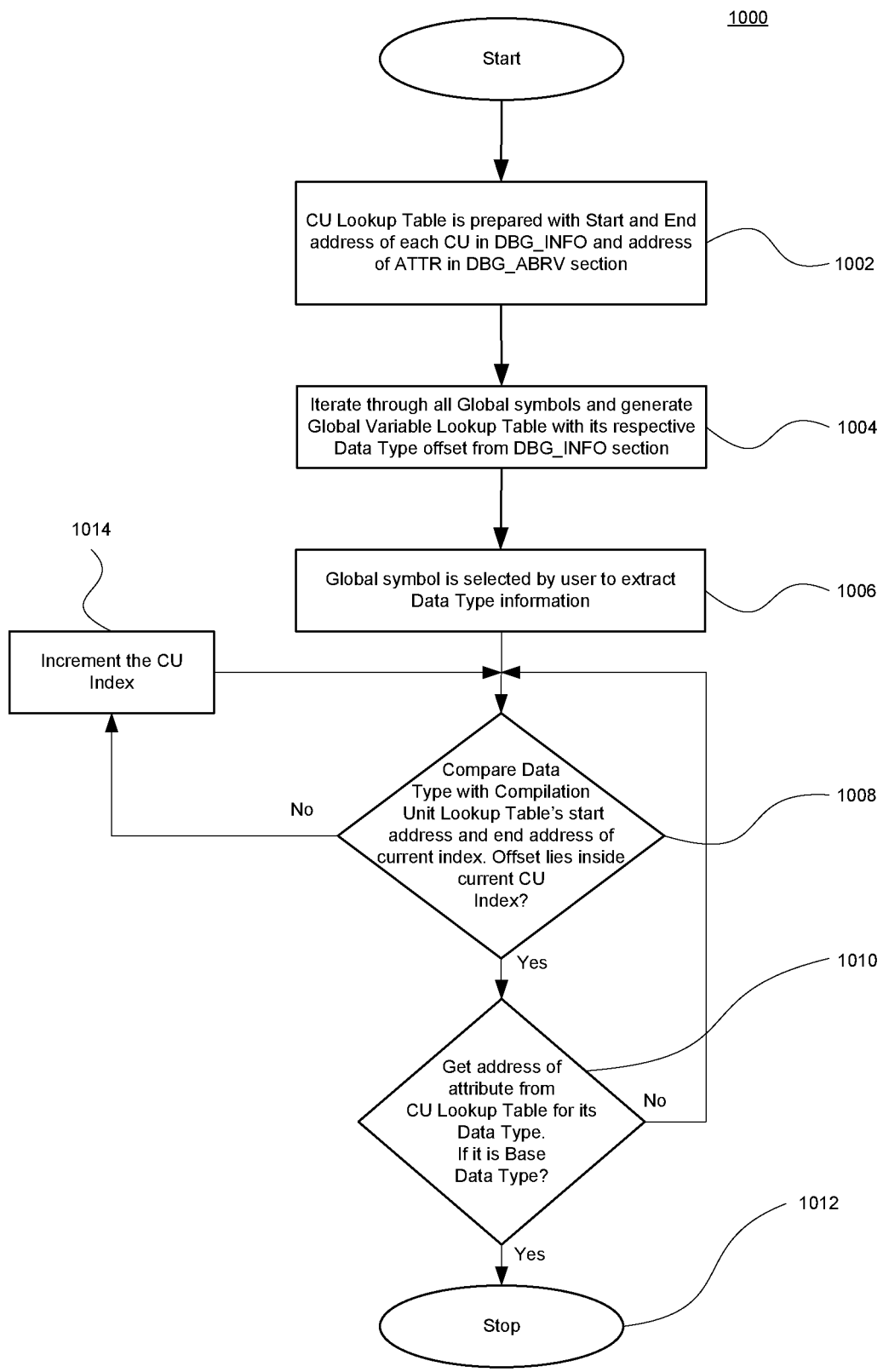

DYNAMIC AND GLOBAL IN-SYSTEM DEBUGGER

BACKGROUND

Typically, as illustrated in FIG. 1, an Embedded System 122 comprises a Central Processing Unit (CPU) 130, Memory 132, Bus Interface 126, peripherals 120, controllers 124 and Debug Unit 128. The peripherals 120 herein refer to one or more hardware ports with a communication protocol such as a Universal Asynchronous Receiver Transmitter (UART), Universal Serial Bus (USB), Serial Peripheral Interface (SPI), Inter-Integrated Circuit (I2C), Secure Digital Input Output (SDIO), Wireless Local area network (WLAN), Bluetooth (BT), Infrared (IR), etc. The Debug Unit 128 is tightly coupled with CPU 130 in the Embedded System 122. The CPU is also referred to as a processor herein. The Embedded System 122 may contain other software or hardware components which are not shown in the FIG. 1.

As illustrated in FIG. 1, a debugger 112 refers to the device with controller unit 114, standard Joint Test Action Group (JTAG) Physical Interface 116 and USB Device Interface 110. The debugger 112 may be usually a specialized hardware device.

The Host Computer 102 comprises JTAG USB Debugger Software 104, Operating System (OS) 134, USB Interface Driver 106 and USB Host Interface 108. The Host Computer 102 may contain other hardware or software components which are not shown in the FIG. 1. An operating system (OS) 134 is system software that manages Host Computer hardware and software resources and provides common services for computer programs.

The Debugger 112 is connected with the Embedded System 122 using the dedicated JTAG physical cable 118. The USB Host Interface 108 of the Host Computer 102 and the USB device interface 110 of the Debugger 112 are connected through the physical USB cable 136.

As shown in FIG. 2, an Executable Binary 202 comprises Program, Global symbols information and Debug Section packed as described in *Debugging With Attributed Record Formats* (DWARF), DWARF Debugging Information Format Committee, Jun. 10, 2010, pp. 1-6, incorporated by reference herein. DWARF is a debugging format used to describe programs. The Executable Binary 202 may follow standard formats such as Executable and Linkable format (ELF). The ELF refers to the whole Executable Binary 202 whereas the DWARF refers to Debug Section 208 alone. The Debug Section 208 of the Executable Binary 202 may also contain additional information which is not shown in the FIG. 2. The Program 204 refers to the set of instructions to control the behavior of the Embedded System 122. The Global symbols information 206 refers to the symbol names used in the Program 204 pointing to a particular address in the Memory 132 of the Embedded System 122. The Global symbols are also referred to as the Global variables and the two terms are used interchangeably herein.

The Debug Section 208 comprises DBG_INFO 210 section and DBG_ABRV 212 section, containing the detailed attributes of Global symbols information 206. The DBG_INFO represents the contents of individual symbols whereas DBG_ABRV represents the attributes of each symbol. As per the DWARF specification, the Global symbols are packed into DBG_INFO and DBG_ABRV in consecutive block units termed as Compilation Unit (CU). Each of the symbols contains the "Data Type" information which indicates the number of bytes occupied by a symbol in Memory (storage) of the Embedded System. Each Data Type comprises one or more "Base Data Type" of different sizes.

Returning to FIG. 1, the JTAG USB Debugger Software 104 in the Host Computer 102 extracts the Program 204 from Executable Binary 202 and loads it into the Memory 132 of the Embedded System. The CPU 130 then executes the Program 204 from the Memory 132 of the Embedded System when powered up. The JTAG USB Debugger Software 104 controls the execution of the CPU 130 through the Debug Unit 128 and provides the symbol information in the Host Computer. Whenever the JTAG USB Debugger Software 104 is accessing the CPU 130, the CPU stops the execution of Program 204 and responds to the Host Computer commands and requests.

The term "Dynamic" herein refers to the capability of the Debugger to operate without halting the processor and "Global" refers to the capability to operate universally across all peripheral interfaces and processor types.

The interface between a Host Computer and the Embedded System is referred herein as "Host interface." This may be USB, SDIO, UART, etc. As shown in FIG. 1, a typical Debugger device is connected to a Host Computer using the host interface. The Debugger comprises a controller unit which transfers the data between USB and JTAG interface. The JTAG interface is physically connected to the Debug Unit in the Embedded System. The Debug Unit is coupled with the CPU in the Embedded System. The CPU communicates with Memory, Peripherals and Controllers within the Embedded System through Bus Interface. A typical JTAG interface, for example, may use six pins. The Debug Unit coupled with the processor in the Embedded System controls the processor whenever the Host Computer tries to access it.

SUMMARY

A Dynamic and Global In-system Debugger is disclosed and is based on standard commonly used interfaces and functions without stalling the processor during debugging. For example, instead of using a dedicated JTAG interface which may be typically the case for many commercial debuggers, Dynamic and Global In-system Debugger works with any one of the inbuilt peripherals in an Embedded System. It is portable to different processing environments to combine with other software components in a Host Computer. The Dynamic and Global In-system Debugger disclosed herein is independent of operating system and it may run in any commercial operating system such as WINDOWS, MAC, ANDROID, LINUX, CHROME and others.

In accordance with an aspect of the present disclosure, a method may debug data of a program stored in a memory of a computer, The method may include: controlling, by a processing device, generating a Compilation Unit (CU) Lookup table including, for each Compilation Unit in the CU Lookup table, a CU index, a start address, an end address and an attribute (ATTR) reference address, in which each Compilation Unit is for at least one global symbol of the program; controlling, by the processing device, searching each of the Compilation Units for each global symbol thereof and Data Type information in a DBG_INFO section of the memory which represents contents of individual symbols of the Compilation Units in the CU Lookup table, and generating, based on the searching, a Global Variable Lookup table including, for each global symbol entry, a name, an address, a size and a Data Type offset address; and controlling, by the processing device, when a global symbol of the program is selected for extracting Data Type information thereof, (A) determining whether the Data Type offset address for the selected global symbol from the Global Variable Lookup Table is between the start address and the end address of the Compilation Unit from the CU Lookup Table having the CU index equal to a CU index counter, (B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and (C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (A) and (B) as long as conditions (C)(i) and (C)(ii) are satisfied.

In one alternative, the at least one global symbol of the program may correspond to a variable or a register.

In one alternative, the method may be implemented by a second computer without hardware for debugging the program which is external to the computer and the second computer.

In one alternative, the method may be implemented by a second computer without interrupting operation of a processor of the computer.

In one alternative, the method may be implemented by a second computer for any processor architecture used in the computer.

In one alternative, the computer and a second computer in which the method may be implemented are communicatively coupled using a generic interface and without a Joint Test Action Group (JTAG) standard physical interface.

In one alternative, the searching for the Data Type information may be performed at predetermined different intervals.

In one alternative, the method may include controlling, by the processing device, obtaining global symbol information and a copy of an entirety of the memory at predetermined different intervals.

In accordance with an aspect of the present disclosure, an apparatus may debug data of a program stored in a memory of a computer. The apparatus may include circuitry configured to control: generating a Compilation Unit (CU) Lookup table including, for each Compilation Unit in the CU Lookup table, a CU index, a start address, an end address and an attribute (ATTR) reference address, in which each Compilation Unit is for at least one global symbol of the program; (II) searching each of the Compilation Units for each global symbol thereof and Data Type information in a DBG_INFO section of the memory which represents contents of individual symbols of the Compilation Units in the CU Lookup table, and generating, based on the searching, a Global Variable Lookup table including, for each global symbol entry, a name, an address, a size and a Data Type offset address; and (III) when a global symbol of the program is selected for extracting Data Type information thereof, (A) determining whether the Data Type offset address for the selected global symbol from the Global Variable Lookup Table is between the start address and the end address of the Compilation Unit from the CU Lookup Table having the CU index equal to a CU index counter, (B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and (C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (III)(A) and (III)(B) as long as conditions (III)(C)(i) and (III)(C)(ii) are satisfied.

In one alternative of the apparatus, the at least one global symbol of the program may correspond to a variable or a register.

In one alternative of the apparatus, the apparatus may be implemented without hardware for debugging the program which is external to the computer and the apparatus.

In one alternative of the apparatus, the apparatus may be implemented to perform (I), (II) and (III) without interrupting operation of a processor of the computer.

In one alternative of the apparatus, the apparatus may be implemented for any processor architecture used in the computer.

In one alternative of the apparatus, the computer and the apparatus may be communicatively coupled using a generic interface and without a Joint Test Action Group (JTAG) standard physical interface.

In one alternative of the apparatus, the searching for the Data Type information is performed at predetermined different intervals.

In one alternative of the apparatus, the circuitry may be configured to control obtaining global symbol information and a copy of an entirety of the memory at predetermined different intervals.

In accordance with an aspect of the present disclosure, a communication device may include a receiver to receive data of a program stored in a memory of a computer; and a processing device configured to control debugging the data of the program. The processing device may be configured to control generating a Compilation Unit (CU) Lookup table including, for each Compilation Unit in the CU Lookup table, a CU index, a start address, an end address and an attribute (ATTR) reference address, in which each Compilation Unit is for at least one global symbol of the program; wherein the processing device is configured to control searching each of the Compilation Units for each global symbol thereof and Data Type information in a DBG_INFO section of the memory which represents contents of individual symbols of the Compilation Units in the CU Lookup table, and generating, based on the searching, a Global Variable Lookup table including, for each global symbol entry, a name, an address, a size and a Data Type offset address; and wherein the processing device is configured to control, when a global symbol of the program is selected for extracting Data Type information thereof, (A) determining whether the Data Type offset address for the selected global symbol from the Global Variable Lookup Table is between the start address and the end address of the Compilation Unit from the CU Lookup Table having the CU index equal to a CU index counter, (B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and (C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (A) and (B) as long as conditions (C)(i) and (C)(ii) are satisfied. In one alternative of the device, the at least one global symbol of the program may correspond to a variable or a register.

In one alternative of the device, the device may be implemented without hardware for debugging the program which is external to the computer and the device.

In one alternative of the device, the device may be implemented for any processor architecture used in the computer.

BRIEF DESCRIPTION OF THE DRAWINGS

FIG. 9 illustrates prior art containing the processing flow for the extraction of Data Type from Executable Binary using linear matching.

FIG. 10 illustrates the processing flow for the extraction of Data Type from Executable Binary according to the aspects of the present disclosure.

DETAILED DESCRIPTION

Figure 1:
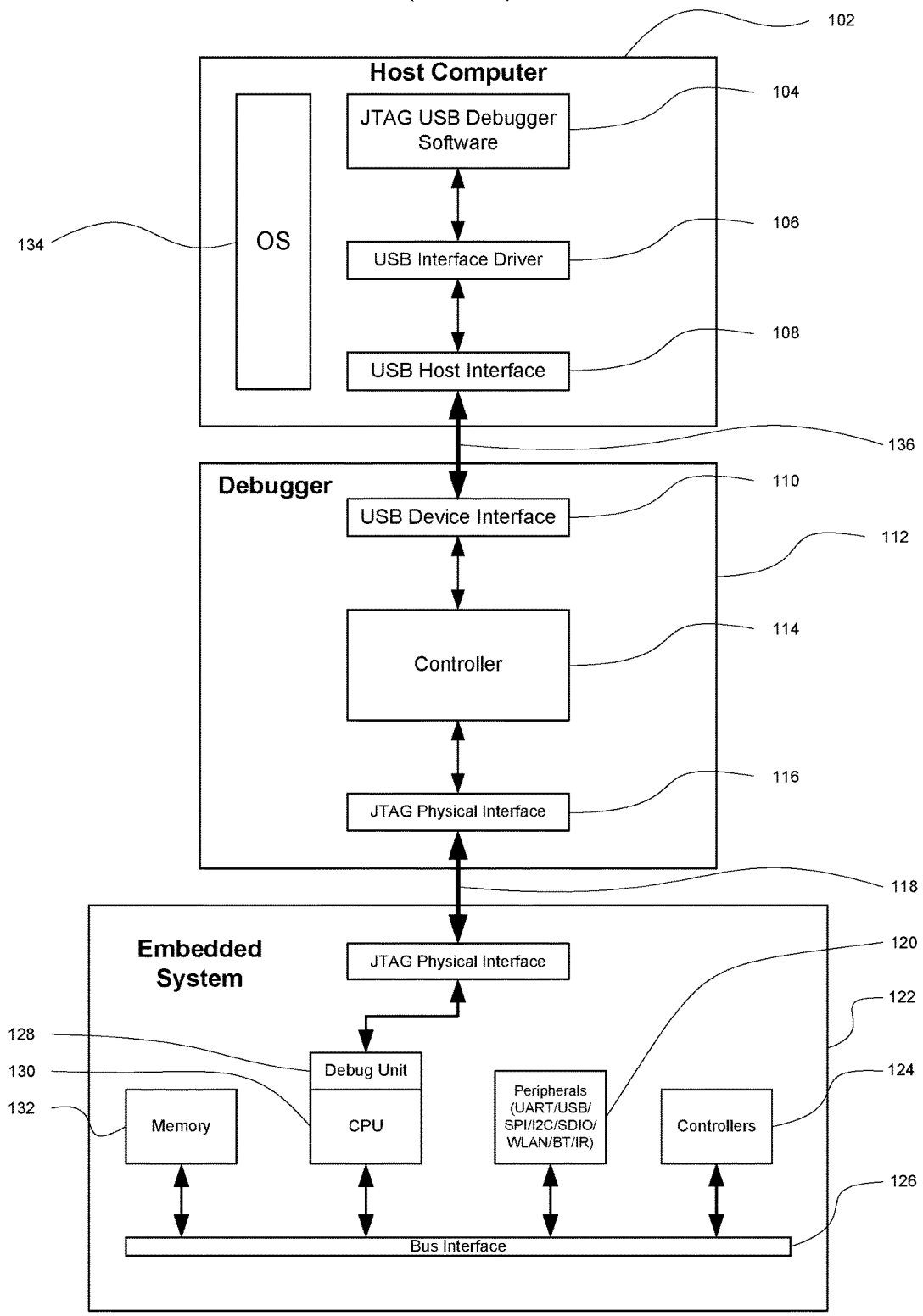
FIG. 1 illustrates prior art containing the high level block diagram of a typical USB JTAG debugger based debugging environment.
Figure 2:
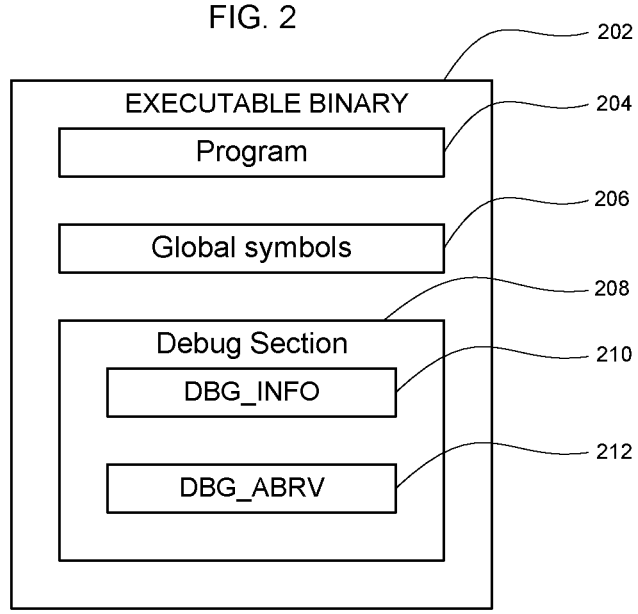
FIG. 2 illustrates prior art containing the structure of an Executable Binary.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

The disclosed method is a Dynamic and Global In-system Debugger which is independent of a host interface (interface agnostic), independent of an Operating System used in the Host Computer (OS agnostic), independent of a processor used in the Embedded System (Processor agnostic) and independent of a compiler used in the generation of Executable Binary (Compiler agnostic). It uses an optimized algorithm to extract the basic Data Type of the selected variable and map it to the relevant data read from the Embedded System's memory space.

Figure 3:
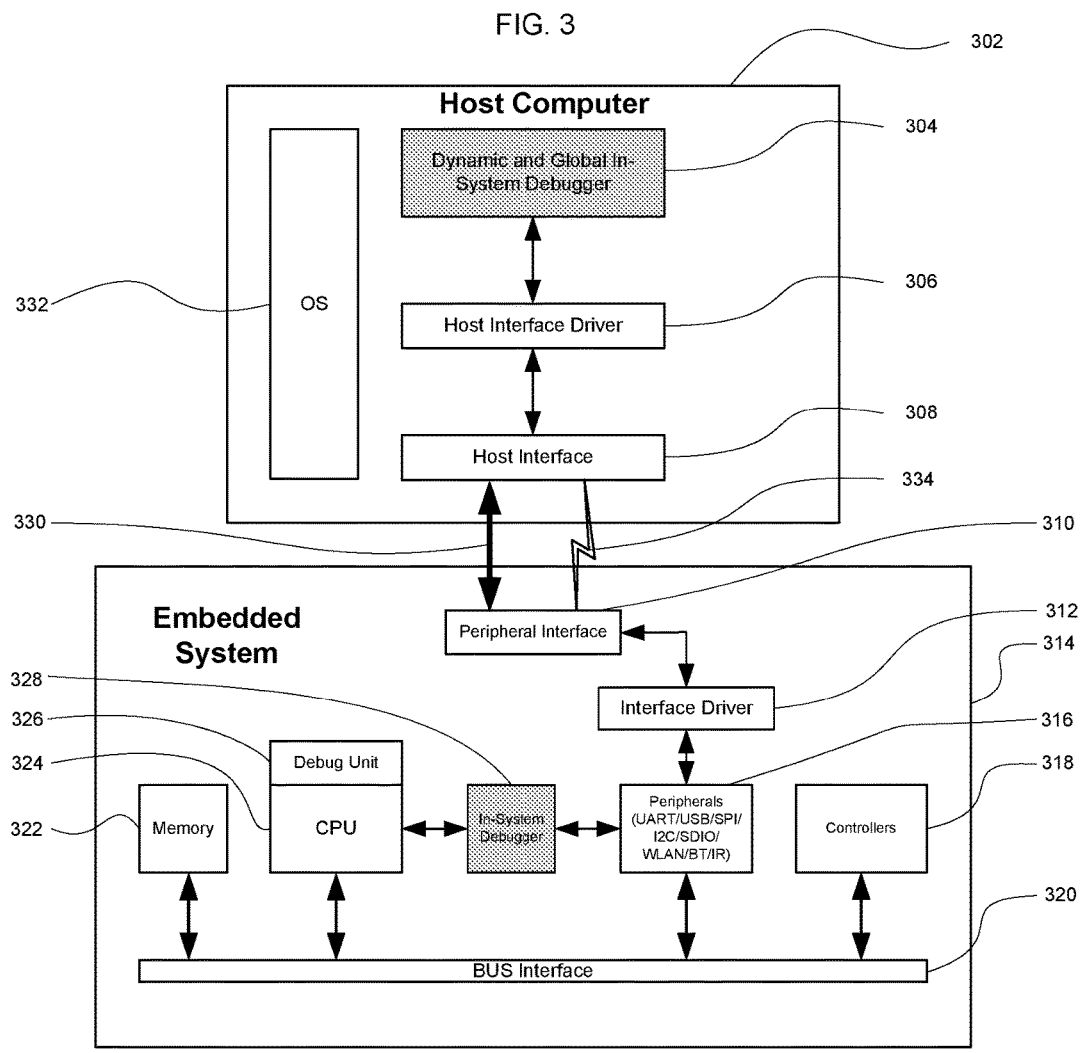
FIG. 3 illustrates high level block diagram of a Dynamic and Global In-system Debugger according to the aspects of the present disclosure.

According to the aspects of the present disclosure, the Dynamic and Global In-system Debugger, illustrated in FIG. 3, provides debugging capability without requiring a dedicated JTAG based Debugger hardware. The Host Interface Driver 306 refers to the software which controls the Peripheral Interface 310 in the Embedded System 314. The Host Interface 308 refers to a peripheral interface receiver and transmitter. A peripheral interface may be a hardware port with one of the wired communication protocols such as UART, USB, I2C, SPI, SDIO or wireless communication protocols such as WLAN, BT or IR. As shown in FIG. 3, the Host Computer 302 comprises Dynamic and Global In-system Debugger software 304 along with the Operating System 332. The Host Computer 302 and Embedded System 314 may be connected either by wired 330 or wireless 334 interfaces. The In-system Debugger software 328 may be part of Program section 204 in the Executable Binary 202 and it may be universal to all processor types. The functionality of the Dynamic and Global In-system Debugger software 304 is abstracted from the underlying processor in the Embedded System and may be used for retrieving Global symbols 206. Unlike conventional debuggers which consume the processor's time while retrieving Global symbol information, the Dynamic and Global In-system debugger does not stall the CPU while retrieving Global symbol information of the variables or co-processor registers.

According to the aspects of the present disclosure, the Dynamic and Global In-system debugger is independent of a processor architecture used in the Embedded System. It maps the address of the symbols contained in the Executable Binary to the data from Embedded System's address space. Irrespective of the processor functionality, the access to data may be obtained from the actual Embedded System using a generic wired and wireless interface.

According to the aspects of the present disclosure, the Dynamic and Global In-system debugger works without stalling the actual execution of the processor in the Embedded System. A typical JTAG-based debug interface holds the processor execution at the current instruction when connected with the debug interface. It may prevent the processor from servicing one or more interrupts during execution. The Dynamic and Global In-system debugger may allow the processor to service all the interrupts as the processor is not stalled for servicing data access requests from the Host Computer.

According to the aspects of the present disclosure, the Dynamic and Global In-system debugger is interface agnostic. The standard wired (USB, UART, SPI, I2C, and SDIO) or wireless (WLAN, Bluetooth, and Infrared) interfaces may be used to establish the connection between the Embedded System and the Host Computer. There is no JTAG physical interface required.

Figure 4:
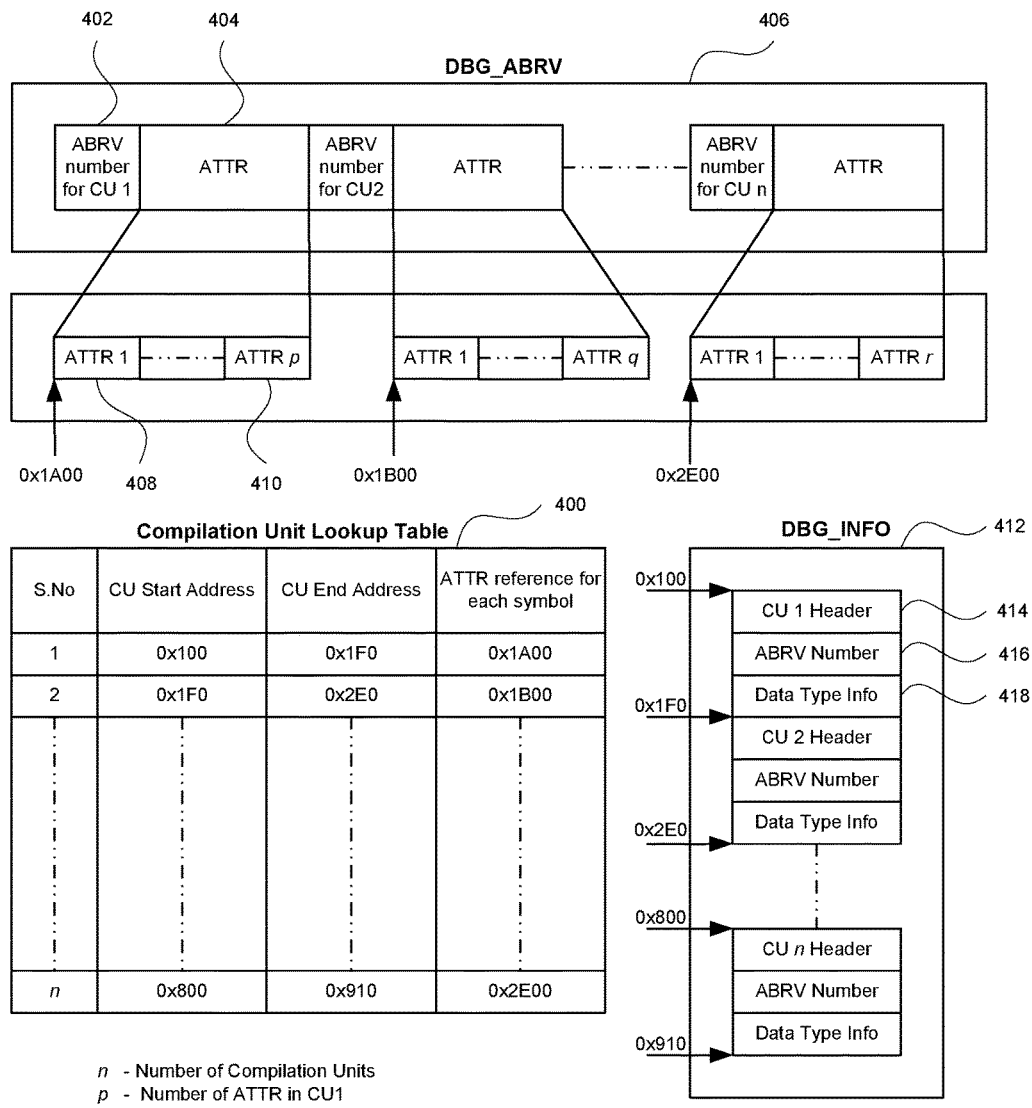
FIG. 4 illustrates a prior art Compilation Unit Lookup Table containing the mapped values of DBG_ABRV section and DBG_INFO section according to the aspects of the present disclosure.

According to the aspects of the present disclosure, the association of a Compilation Unit (CU) Lookup Table with DBG_INFO and DBG_ABRV sections is illustrated in FIG. 4. The Compilation Unit Lookup Table 400 comprises a serial number for each Compilation Unit, CU Start Address of each Compilation Unit, CU End Address of each Compilation Unit and the address reference for each of the attributes (ATTR) in the Compilation Unit. The first Compilation Unit in DBG_INFO section 412 comprises Header 414, Abbreviation (ABRV) Number 416 and Data Type information (Data Type Info) 418. Similarly there may be additional Compilation Units packed into the DBG_INFO section 412. The first Compilation Unit in DBG_ABRV section 406 contains abbreviation number 402 and Attributes (ATTR) 404. The attribute field is packed for each of the p symbols 408 to 410. FIG. 4 illustrates n Compilation Units. The attributes are illustrated with p, q and r symbols for the first, second and $n^{th}$ Compilation Units respectively.

Figure 5:
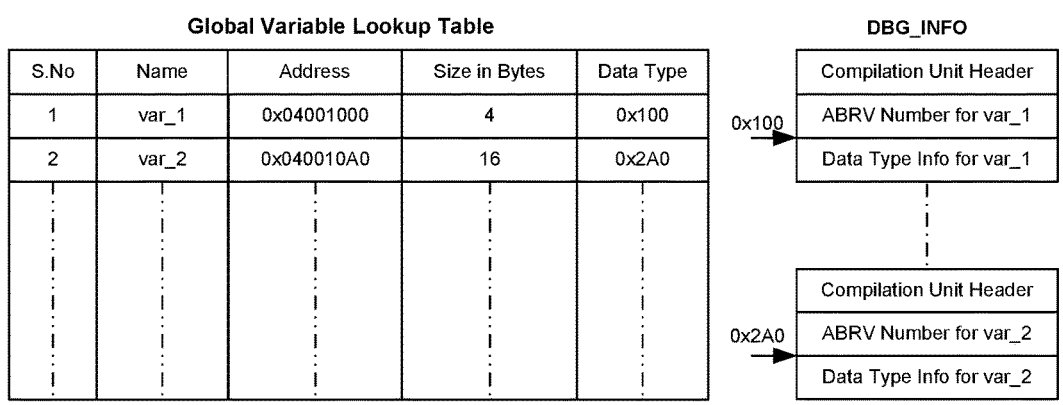
FIG. 5 illustrates a Global Variable Lookup Table mapped with the DBG_INFO section according to the aspects of the present disclosure.

According to the aspects of the present disclosure, the association of a Global Variable Lookup Table with DBG_INFO section is illustrated in FIG. 5. The Global Variable Lookup Table comprises serial number for each entry, Name, Address, Size in Bytes, and address reference to Data Type information in the DBG_INFO section. The table is illustrated with sample address values and the address values point to the DBG_INFO section.

Figure 6:
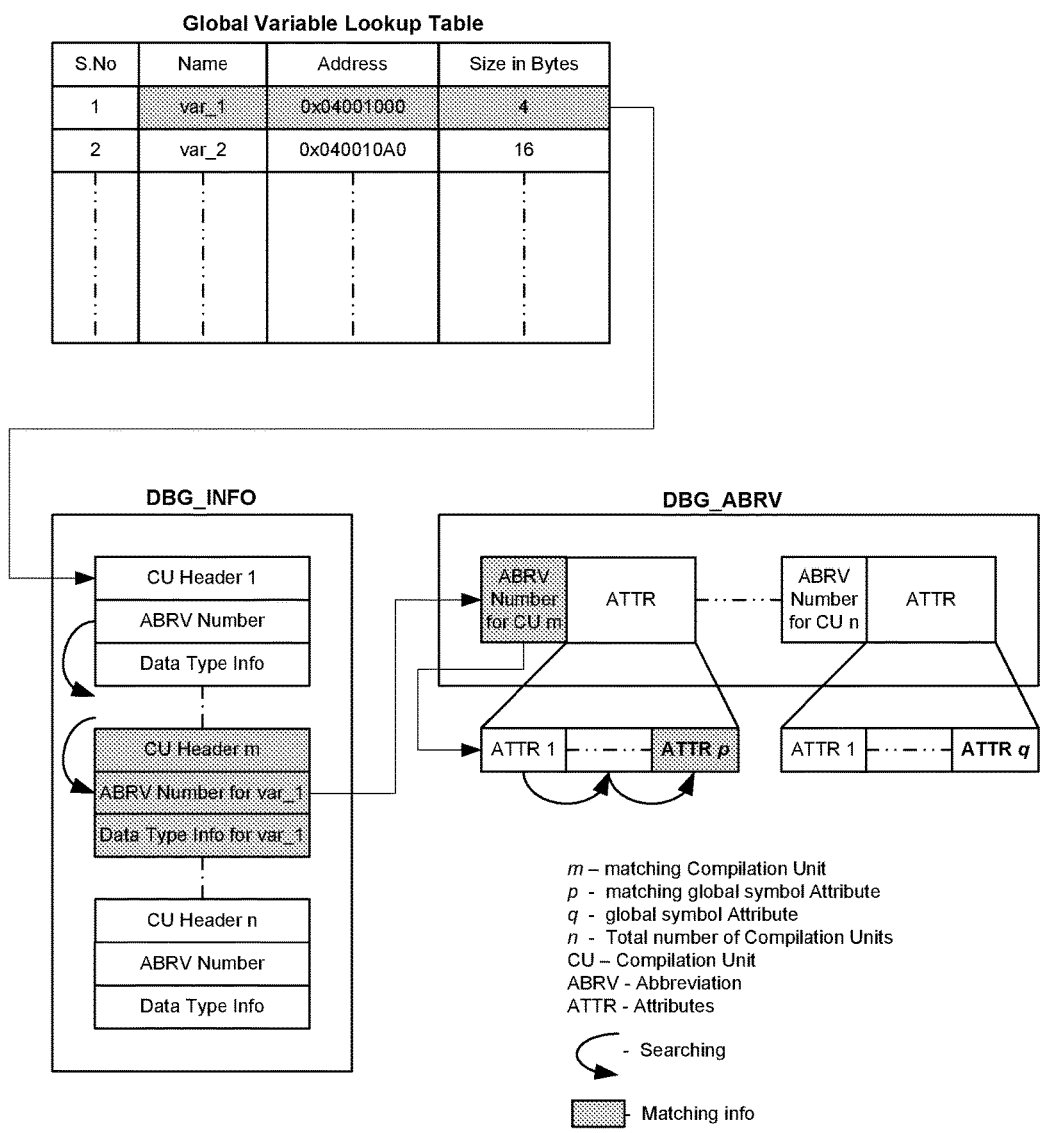
FIG. 6 illustrates prior art containing the searching of Data Types by linear matching.

FIG. 6 illustrates the searching of Global symbol information using a conventional method and the Global Variable Lookup Table with the respective address from the DBG_INFO section and DBG_ABRV section. The highlighted blocks indicate the information of Global symbol "var_1" in DBG_INFO section and DBG_ABRV section. The diagram in FIG. 6 illustrates how symbol information is searched in the DBG_INFO section and DBG_ABRV section. FIG. 6 provides a pictorial representation of Global Variable Lookup Table elements and search flow of the same with the elements in the DBG_INFO section and the DBG_ABRV section. The Global symbol "var_1" is compared with the attributes of first Compilation Unit in DBG_INFO section and it is assumed to be matched after m iterations. The respective Base Data Type is obtained from the DBG_ABRV section after searching through p iterations.

Figure 7:
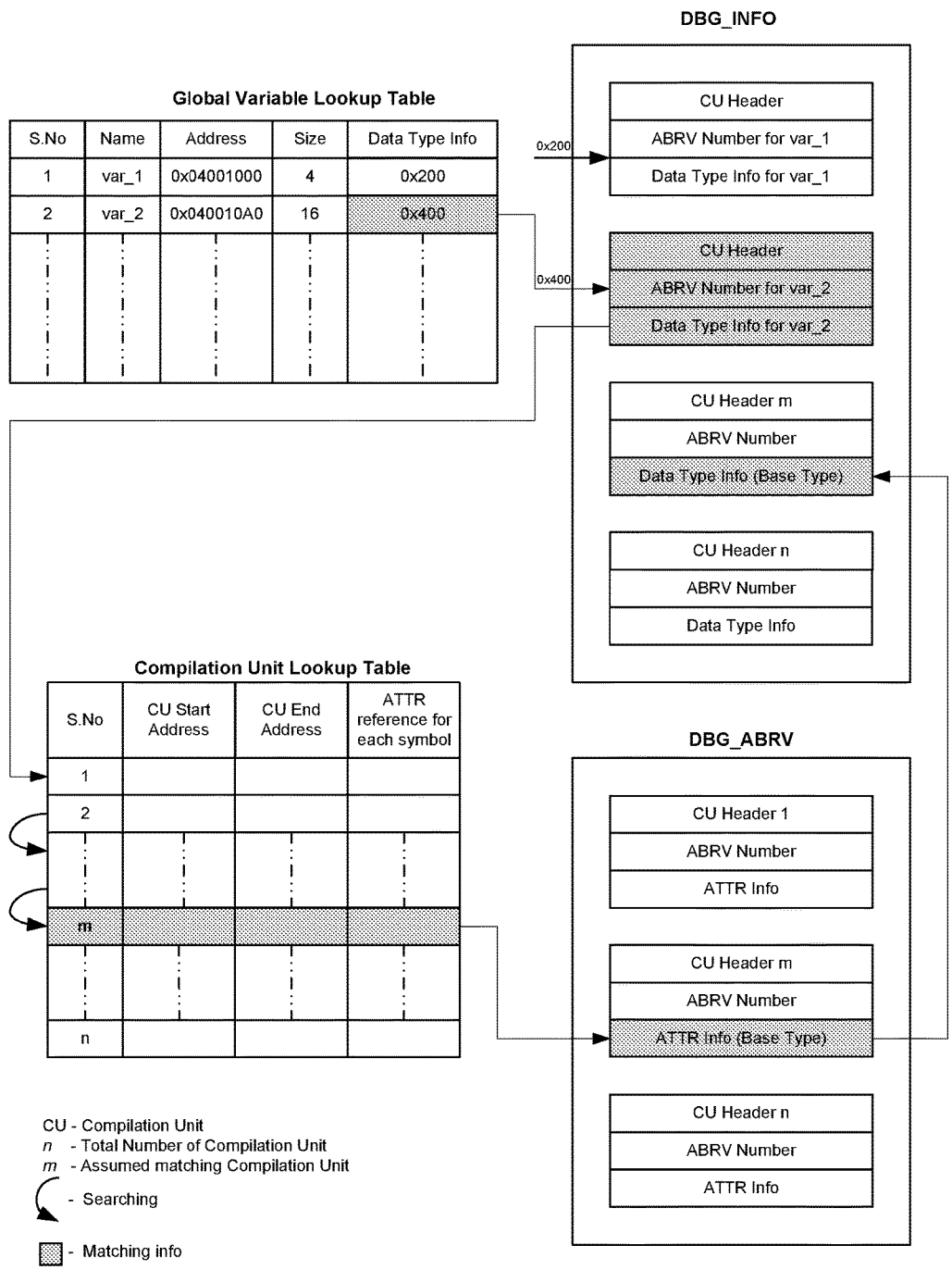
FIG. 7 illustrates the searching of Data Types according to the aspects of the present disclosure.

According to the aspects of the present disclosure, FIG. 7 illustrates the method for searching of symbol information in the Dynamic and Global In-system Debugger. The highlighted blocks indicate the information of symbol "var_2". The pre-mapped link (Data Type Info) in Global Variable Lookup Table and the Compilation Unit Lookup Table reduces the searching time of symbol information in comparison with the method described in FIG. 6. For "var_2" the data type information is pre-mapped in the Global Variable Lookup Table as illustrated in FIG. 7, which avoids m iterations for searching attributes in DBG_INFO section as illustrated in FIG. 6. The Compilation Unit Lookup Table contains the pre-mapped link of Attribute information of the DBG_ABRV section as shown in FIG. 7 which reduces p iterations for searching of Base Data Type as shown in FIG. 6

Figure 8:
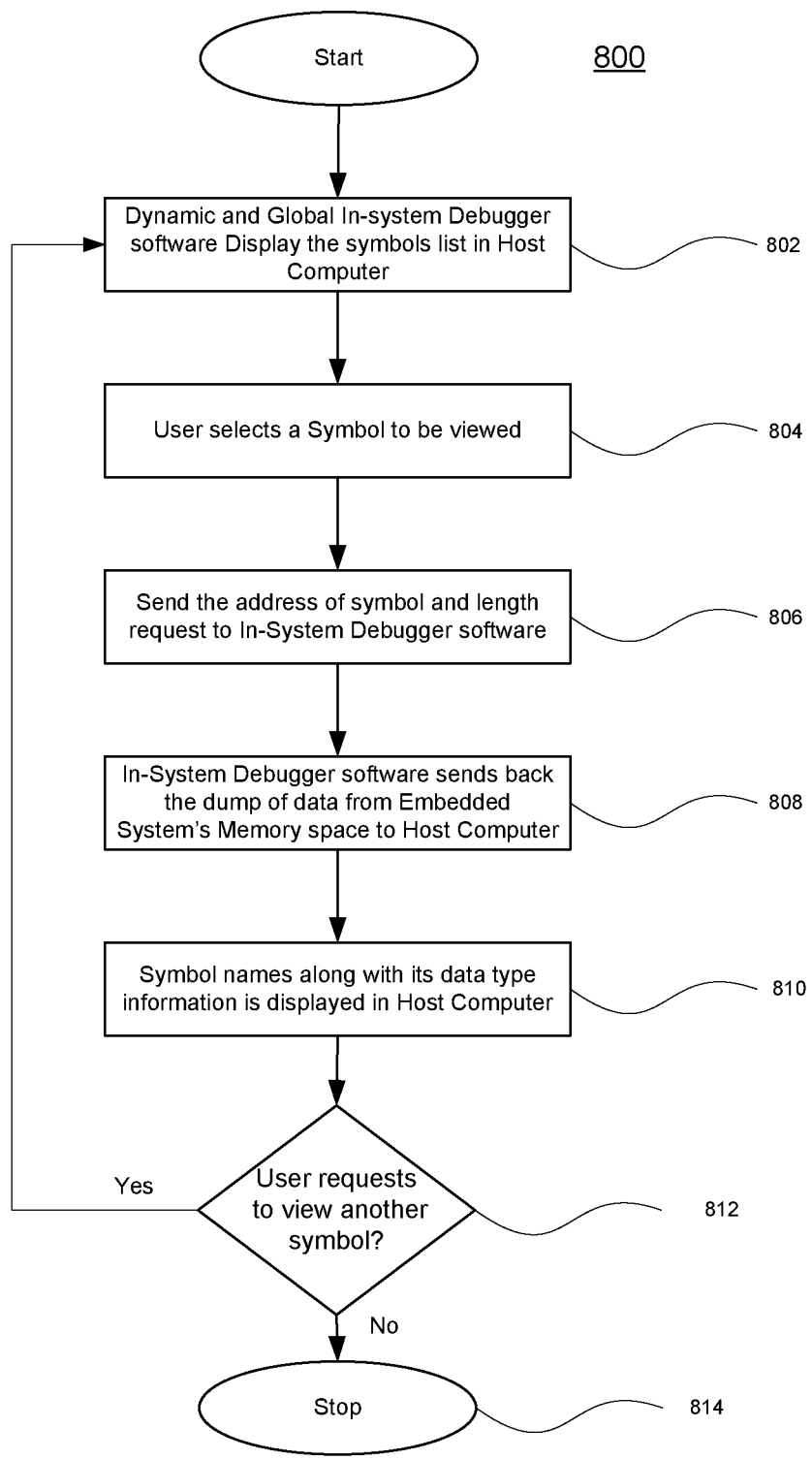
FIG. 8 illustrates a processing flow for the Dynamic and Global In-system Debugger.

As illustrated by flow diagram 800 in FIG. 8, the Dynamic and Global In-system debugger may use the dump of data from the Embedded System's address space and map it to the symbols in the Executable Binary. At processing stage 802, the Debugger software may provide a list of the Global symbols to the user in the Host Computer. At processing stage 804, a symbol may be chosen by a user from the list being displayed on the Host Computer. At processing stage 806, the address of the symbol and its length may be requested to the In-system Debugger software in the Embedded System. At processing stage 808, Embedded System replies back with the dump of data from the memory to the Dynamic and Global In-system Debugger software in the Host computer. At processing stage 810, the obtained dump of data is displayed along with its symbol information. At processing stage 812, if the user selects to see another symbol the processing continues at processing stage 802. Otherwise, the processing suitably terminates at stage 814. The disclosed method simplifies the debugging by utilizing the existing peripheral interface in the Embedded System rather than the dedicated JTAG interface or additional physical USB to JTAG converters. The In-system debugging software residing in the Embedded System facilitates the response to the read request to address spaces initiated from the Host Computer.

According to the aspects of the present disclosure, the read request to the address space in the Embedded System may be obtained at different intervals of time which eliminates the need for In-system data logging. A core dump is a file containing the copy of data in the entire Memory of Embedded System at a particular moment of time. The Dynamic and Global In-system Debugger may be further extended to obtain the same symbol and core dump at various intervals of time.

The flow diagram 900 in FIG. 9 illustrates extraction of Data Type from Executable Binary using linear matching. At processing stage 902, offset of the first Compilation Unit header in DBG_INFO section is obtained from Executable Binary. At processing stage 904, the address of DBG_ABRV section offset is extracted from the current (first) Compilation Unit header in DBG_INFO. At processing stage 906, the symbol information (Data Type) specified by a current attribute is extracted from the DBG_INFO section. At processing stage 908, the extracted symbol information is checked to determine whether it matches with the Data Type of the user selected symbol, in other words, whether the extracted Data Type is valid. If the extracted Data Type is valid the processing continues at processing stage 910, else it goes to processing stage 914. At processing stage 910, the obtained Data Type is again checked to determine whether it is a Base Data Type. If the result is the Base Data Type is obtained then the processing suitably terminates at stage 912, and if the result is the Base Data Type is not obtained the processing returns to the processing stage 902. Returning to processing stage 914, the attribute number is checked at this stage to determine if it corresponds to the last attribute number of the current Compilation Unit. If the attribute number does not correspond to the last attribute number of the current Compilation Unit, the processing continues to processing stage 918, and if the attribute number corresponds to the last attribute number of the current Compilation Unit the processing continues to processing stage 916. At processing stage 916, the attribute number is incremented and the processing continues at processing stage 906. At processing stage 918, the next Compilation Unit is selected and the processing continues at the processing stage 904.

According to the aspects of the present disclosure, the flow diagram 1000 in FIG. 10 illustrates the optimized algorithm for the extraction of Global symbols and their Base Data Type. At processing stage 1002, the Compilation Unit Lookup table is generated with a start and an end address of each Compilation Unit and a respective attribute offset address is obtained for each Compilation Unit. At processing stage 1004, according to the aspects of the present disclosure, each Global symbol is iteratively searched in the Compilation Units and Data Type information in the DBG_INFO section and is mapped in the Global Variable Lookup table as shown in FIG. 5. The Global Variable Lookup table comprises a global variable name, an address, a size and a Data Type offset address of the DBG_INFO section. At processing stage 1006, a Global symbol is selected by a user to extract its Data Type. At processing stage 1008, the Data Type offset is compared with a start address and an end address of the Compilation Unit from the Compilation Unit Lookup Table. If the Data Type offset lies between the start address and end address, then processing continues at processing stage 1010 or else the processing continues at processing stage 1014. At processing stage 1010, the offset address of the attribute in DBG_ABRV section is obtained and a Data Type for the offset address is checked to determine whether it is a Base Data type. If a Base Data Type is determined in stage 1010, then the processing suitably terminates at stage 1012 or else the processing returns to processing stage 1008. After completing processing in stage 1008 as described earlier, processing then continues at stage 1014 where the compilation unit index is incremented and again goes to processing stage 1008. The reference address of a first Compilation Unit is pointed to by the headers whereas the subsequent Compilation Unit has to be accessed by calculating the offset. According to the aspects of the present disclosure, when a global variable is selected by a user, instead of searching it from the start address of the first Compilation Unit as illustrated in FIG. 6 and FIG. 9, the pre-mapped link is used in a Global Variable Symbol Table (address of attributes) and a Compilation Unit Lookup Table as illustrated in FIG. 7 and FIG. 10. The processing stages 904, 906, 908, 914, 916 and 918 is replaced with the processing stages 1008 and 1014 which may require reduced processor execution time and reduced memory requirement.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for debugging data of a program stored in a memory of a computer, the method comprising:
    controlling, by a hardware processing device,
        generating a Compilation Unit (CU) Lookup table including, for each Compilation Unit in the CU Lookup table, a CU index, a start address, an end address and an attribute (ATTR) reference address, in which each Compilation Unit is for at least one global symbol of the program;
        searching each of the Compilation Units for each global symbol thereof and Data Type information in a DBG_INFO section of the memory which represents contents of individual symbols of the Compilation Units in the CU Lookup table;
        generating, based on the searching, a Global Variable Lookup table including, for each global symbol entry, a name, an address, a size and a Data Type offset address;
        when a global symbol of the program is selected for extracting Data Type information thereof,
        (A) determining whether the Data Type offset address for the selected global symbol from the Global Variable Lookup Table is between the start address and the end address of the Compilation Unit from the CU Lookup Table having the CU index equal to a CU index counter,
        (B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and
        (C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (A) and (B) as long as conditions (C)(i) and (C)(ii) are satisfied; and
        obtaining global symbol information, and a copy of the selected global symbol from the memory.

2. The method of claim 1, wherein the at least one global symbol of the program corresponds to a variable or a register.

3. The method of claim 1, wherein the method is implemented by a second computer without hardware for debugging the program which is external to the computer and the second computer.

4. The method of claim 1, wherein the method is implemented by a second computer without interrupting operation of a processor of the computer.

5. The method of claim 1, wherein the method is implemented by a second computer for any processor architecture used in the computer.

6. The method of claim 1, wherein the computer and a second computer in which the method is implemented are communicatively coupled using a generic interface and without a Joint Test Action Group (JTAG) standard physical interface.

7. The method of claim 1, wherein the searching for the Data Type information is performed at predetermined different intervals.

8. The method of claim 1, further comprising:
    controlling, by the hardware processing device, obtaining a copy of an entirety of the memory at predetermined different intervals.

9. An apparatus for debugging data of a program stored in a memory of a computer, the apparatus comprising:
    a hardware processing device configured to control:
        (I) generating a Compilation Unit (CU) Lookup table including, for each Compilation Unit in the CU Lookup table, a CU index, a start address, an end address and an attribute (ATTR) reference address, in which each Compilation Unit is for at least one global symbol of the program;
        (II) searching each of the Compilation Units for each global symbol thereof and Data Type information in a DBG_INFO section of the memory which represents contents of individual symbols of the Compilation Units in the CU Lookup table, and
        generating, based on the searching, a Global Variable Lookup table including, for each global symbol entry, a name, an address, a size and a Data Type offset address;
        (III) when a global symbol of the program is selected for extracting Data Type information thereof,
        (A) determining whether the Data Type offset address for the selected global symbol from the Global Variable Lookup Table is between the start address and the end address of the Compilation Unit from the CU Lookup Table having the CU index equal to a CU index counter, (B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and (C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (III)(A) and (III)(B) as long as conditions (III)(C)(i) and (III)(C)(ii) are satisfied; and (IV) obtaining global symbol information, and a copy of the selected global symbol from the memory.

10. The apparatus of claim 9, wherein the at least one global symbol of the program corresponds to a variable or a register.

11. The apparatus of claim 9, wherein the apparatus is implemented without hardware for debugging the program which is external to the computer and the apparatus.

12. The apparatus of claim 9, wherein the apparatus is implemented to perform (I), (II) and (III) without interrupting operation of a processor of the computer.

13. The apparatus of claim 9, wherein the apparatus is implemented for any processor architecture used in the computer.

14. The apparatus of claim 9, wherein the computer and the apparatus are communicatively coupled using a generic interface and without a Joint Test Action Group (JTAG) standard physical interface.

15. The apparatus of claim 9, wherein the searching for the Data Type information is performed at predetermined different intervals.

16. The apparatus of claim 9,
wherein the hardware processing device is configured to control obtaining a copy of an entirety of the memory at predetermined different intervals.

17. A communication device comprising:
a receiver to receive data of a program stored in a memory of a computer; and
a hardware processing device configured to control debugging the data of the program,
wherein the hardware processing device is configured to control generating a Compilation Unit (CU) Lookup table including, for each Compilation Unit in the CU Lookup table, a CU index, a start address, an end address and an attribute (ATTR) reference address, in which each Compilation Unit is for at least one global symbol of the program;
wherein the hardware processing device is configured to control
searching each of the Compilation Units for each global symbol thereof and Data Type information in a DBG_INFO section of the memory which represents contents of individual symbols of the Compilation Units in the CU Lookup table,
generating, based on the searching, a Global Variable Lookup table including, for each global symbol entry, a name, an address, a size and a Data Type offset address, when a global symbol of the program is selected for extracting Data Type information thereof,
(A) determining whether the Data Type offset address for the selected global symbol from the Global Variable Lookup Table is between the start address and the end address of the Compilation Unit from the CU Lookup Table having the CU index equal to a CU index counter,
(B) when the Data Type offset from the Global Variable Lookup for the selected global symbol is determined not to be between the start address and the end address of the Compilation Unit from the CU Lookup Table having the CU index equal to the CU index counter, incrementing the CU index counter and performing (A) and (B), and
(C) when (i) the Data Type offset from the Global Variable Lookup for the selected global symbol is determined to be between the start address and the end address of the Compilation Unit from the CU Lookup Table having the CU index equal to the CU index counter and (ii) the attribute reference address from the CU Lookup Table of the Compilation Unit having the CU index equal to the CU index counter is determined not to have a Base Data Type as a Data Type thereof, repeatedly performing (A) and (B) as long as conditions (C)(i) and (C)(ii) are satisfied, and
obtaining global symbol information, and a copy of the selected global symbol from the memory.

18. The communication device of claim 17, wherein the at least one global symbol of the program corresponds to a variable or a register.

19. The communication device of claim 17, wherein the communication device is implemented without hardware for debugging the program which is external to the computer and the communication device.

20. The communication device of claim 17, wherein the communication device is implemented for any processor architecture used in the computer.

* * * * *